United States Patent
Ifrach et al.

(10) Patent No.: US 11,611,600 B1
(45) Date of Patent: Mar. 21, 2023

(54) STREAMING DATA PROCESSING FOR HYBRID ONLINE MEETINGS

(71) Applicant: Microsoft Technology Licensing, LLC, Redmond, WA (US)

(72) Inventors: Shai Ifrach, Yavne (IL); Haim Somech, Ramat Gan (IL)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/411,905

(22) Filed: Aug. 25, 2021

(51) Int. Cl.
| | |
|---|---|
| *H04L 65/403* | (2022.01) |
| *H04N 5/262* | (2006.01) |
| *G10L 25/78* | (2013.01) |
| *H04L 65/60* | (2022.01) |
| *G10L 17/02* | (2013.01) |
| *H04N 5/232* | (2006.01) |
| *G06V 40/16* | (2022.01) |

(52) U.S. Cl.
CPC .......... *H04L 65/403* (2013.01); *G06V 40/172* (2022.01); *G10L 17/02* (2013.01); *G10L 25/78* (2013.01); *H04L 65/60* (2013.01); *H04N 5/23299* (2018.08); *H04N 5/2628* (2013.01)

(58) Field of Classification Search
CPC ......... H04L 29/06; H04L 17/02; H04L 25/78; H04N 5/262; H04N 5/232; G06K 9/00
USPC ........................................... 348/14.01–14.16
See application file for complete search history.

(56) References Cited

U.S. PATENT DOCUMENTS

| | | | |
|---|---|---|---|
| 8,558,864 B1* | 10/2013 | Koller | H04N 7/155 |
| | | | 455/416 |
| 9,749,367 B1 | 8/2017 | Kirby et al. | |
| 9,774,823 B1 | 9/2017 | Gadnir et al. | |
| 9,900,554 B2 | 2/2018 | Ursin et al. | |
| 10,321,095 B2 | 6/2019 | Krantz et al. | |
| 10,609,332 B1* | 3/2020 | Turbell | H04N 7/152 |
| 10,706,391 B2 | 7/2020 | Yang et al. | |
| 10,917,613 B1 | 2/2021 | Chiarella et al. | |
| 2009/0147070 A1 | 6/2009 | Marathe et al. | |

(Continued)

OTHER PUBLICATIONS

Rafferty, et al., "Hybrid-Webinar Events: Combining Your Online and Offline Attendees", Retrieved from: https://www.glueup.com/blog/hybrid-webinars, Jun. 19, 2020, 8 Pages.

(Continued)

*Primary Examiner* — Melur Ramakrishnaiah
(74) *Attorney, Agent, or Firm* — Ray Quinney & Nebeker P.C.; James Bullough (57) ABSTRACT

Techniques of streaming data processing for hybrid online meetings are disclosed herein. In one example, a method includes receiving, at the remote server, a video stream captured by a camera in the conference room. The video stream captures images of multiple local participants of an online meeting. The method also includes determining identities of the captured images of the multiple local participants in the received video stream using meeting information of the online meeting and generating a set of individual video streams each corresponding to one of the multiple local participants. The set of individual video streams can then be transmitted to the second computing device corresponding to a remote participant of the online meeting as if the multiple local participants are virtually joining the online meeting.

17 Claims, 7 Drawing Sheets

(56) References Cited

U.S. PATENT DOCUMENTS

| | | |
|---|---|---|
| 2009/0210491 A1 | 8/2009 | Thakkar et al. |
| 2010/0085415 A1* | 4/2010 | Rahman .................... G01S 3/80 |
| | | 348/E7.083 |
| 2012/0150956 A1 | 6/2012 | Tucker et al. |
| 2013/0162752 A1* | 6/2013 | Herz ........................ H04N 7/15 |
| | | 348/E7.083 |
| 2013/0169742 A1 | 7/2013 | Wu et al. |
| 2015/0189233 A1* | 7/2015 | Carpenter ................ H04N 7/15 |
| | | 348/E7.083 |
| 2016/0014277 A1* | 1/2016 | Tichauer ............. H04L 65/4053 |
| | | 370/260 |
| 2016/0307165 A1 | 10/2016 | Grødum et al. |
| 2019/0132367 A1 | 5/2019 | Devinck et al. |
| 2019/0215464 A1* | 7/2019 | Kumar .................... G10L 17/00 |
| 2021/0111916 A1 | 4/2021 | Velayutham et al. |

OTHER PUBLICATIONS

"International Search Report and Written Opinion Issued in PCT Application No. PCT/US22/035631", dated Sep. 30, 2022, 14 Pages.

\* cited by examiner

STREAMING DATA PROCESSING FOR HYBRID ONLINE MEETINGS

BACKGROUND

Online meeting generally refers to a computing platform that enables multiple users to interact with one another via video/audio streaming delivered real-time by a computer network such as the Internet. During a meeting session, computing devices can initially establish streaming connections with a remote server configured to relay video/audio streams for the session. Upon establishing the streaming connections, each computing device can capture and transmit to the remote server a video/audio stream of a participant. The remote server then can then relay the received video/audio streams to the other participants. As such, the participants of the online meeting can interact with and view videos of one another in real-time.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Online meetings can sometimes involve a mixture of local participants and one or more online participants. Such online meetings are sometime referred to as hybrid online meetings. For example, multiple local participants can hold a meeting in a conference room while additional remote participants joining the meeting via video/audio streaming to a computing device in the conference room. Though a computing device in the conference room can capture and transmit an overview video stream of the conference room, user experience of the remote participants can be very different than that of the local participants. For instance, the video stream from the conference room may be captured using a wide-angle camera to provide a broad view of the conference room. As such, the video stream from the conference room may not adequately identify the local participants or who is currently speaking. Also, the general view of the conference room may lead the remote participants to feel as observers instead of participants of the online meeting. The different user experiences may cause the hybrid online meeting to be less productive and inclusive than desired.

Several embodiments of the disclosed technology can address at least some aspects of the foregoing shortcomings of hybrid online meetings by implementing streaming data processing at an online meeting platform. The streaming data processing can allow remote participants to view local participants as if the local participants are also joining the online meeting virtually. In certain embodiments, upon launching an online meeting, a video processor at the remote server can be configured to determine identities of the local participants by retrieving data of the scheduled meeting from a calendar server. The retrieved data can represent, for instance, names, email addresses, identification photos, organizational positions, office locations, and/or other suitable information of the local participants. In other embodiments, the retrieved data can also include or be used to retrieve audio samples of the local participants. Such audio samples may be previous recorded by the local participants with appropriate user consent. In further embodiments, at least one module of the video processor may be a part of a computing device in the conference room or other suitable components of the online meeting platform.

During operation, the video processor can receive a raw video stream of a general view of the conference room from, for instance, a camera or a computing device in the conference room. Upon receiving the raw video stream, in certain embodiments, the video processor can be configured to identify each local participant using identification photos of the local participants via facial recognition. For example, using the identification photos, the video processor can be configured to identify facial features of the local participants by extracting landmarks or features, such as a relative position, size, and/or shape of the eyes, nose, cheekbones, and jaw, from the identification photos of the local participants. The video processor can then be configured to identify each local participants in the raw video stream using the extracted landmarks or features in one or more frames of the raw video stream. In other embodiments, the video processor can also be configured to identify each local participants via voice matching using the retrieved audio samples in lieu of or in addition to the identification photos. In further embodiments, each local participants may be identified via user tagging or via other suitable techniques.

Upon identifying each local participant in the raw video stream, the video processor can be configured to generate multiple individual video streams corresponding to each local participant in the conference room from the raw video stream. In certain implementations, the raw video stream captured by the camera can be cropped or trimmed to eliminate other local participants to generate an individual video stream for one of the local participants. In one embodiment, each frame of the cropped individual video stream can have a preset fixed size (e.g., 1280 by 720 pixels) of an image and/or the identification photo of the local participant in at least approximately a center of the image/video. In another embodiment, the image/video of the local participant in each frame can be digitally zoomed to be a preset size. In further embodiments, the cropped individual video stream can also have a preselected or dynamically adjusted aspect ratio (e.g., 3:4) or have other suitable characteristics. Once the individual video streams are generated, the video processor or other components of the remote server can be configured to transmit the individual video streams to the remote participants instead of the raw video stream. In other implementations, the foregoing processing of the raw video stream can be performed at the computing device in the conference room before transmitting the individual video streams to the remote server for delivery to the remote participants.

In further implementation, the video processor can be configured to generate the individual video streams by modulating and focusing the camera located in the conference room. In one embodiment, upon detecting speech from a local participant in the conference room, the video processor can be configured to control movement of the camera (e.g., pivot, pan, etc.) toward the local participant providing the speech. The video processor can also be configured to cause the camera to focus on and optionally zoom in on the local participant. The video processor can then capture an individual video stream of the local participant via the camera while the local participant continues to speak. In other embodiments, the video processor can also be configured to filter out audio signals from other local participants while speech is detected from the speaking local participant. While the camera is focused on the speaking local participant, individual video streams of other local participants may be looped or frozen.

Several embodiments of the video processor can thus provide the individual video streams to the remote participants as if the local participants are attending the meeting virtually. With the individual video streams, the remote server can be configured to provide additional functionalities to the remote participants. For example, the remote server can be configured to identify each individual video streams with a corresponding name, email address, or other suitable identifier of one of the local participants. The remote server can also be configured to identify a local participant who is currently speaking, for instance, by providing a speech indicator on the individual video stream. In addition, the remote servers can be configured to allow the remote participants to mute one or more local participants in the conference room by activating suitable controls on the corresponding individual video streams. As such, the online meeting session with the individual video streams can be more productive and inclusive than with an overview video stream of the conference room.

DETAILED DESCRIPTION

Certain embodiments of systems, devices, components, modules, routines, data structures, and processes for streaming data processing in an online meeting platform are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-6.

The disclosure herein is generally directed to streaming data processing in an online meeting platform. Online meetings can allow participants to interact with one another via video/audio streaming in real-time by a computer network such as the Internet. During a meeting session, computing devices can initially establish streaming connections with a remote server configured to relay video/audio streams for the session. Upon establishing the streaming connections, each computing device can capture and continuously transmit to the remote server a video/audio stream of a participant. The remote server then can then relay the received video/audio streams to the other participants. As such, the participants of the online meeting can interact with and view videos of one another in real-time.

Online meetings can sometimes be hybrid by having local participants and remote participants joining the online meeting virtually. Though a computing device in the conference room can capture and transmit an overview video stream of the conference room, user experience of the remote participants can be very different than that of the local participants. For instance, the video stream from the conference room may be captured using a wide-angle camera to provide a broad view of the conference room. As such, the video stream from the conference room may not adequately identify the local participants or who is currently speaking. Also, the broad view of the conference room may lead the remote participants to feel as observers instead of participants of the online meeting. The different user experiences may cause the hybrid online meeting to be less productive and inclusive than desired.

Several embodiments of the disclosed technology can address at least some aspects of the foregoing shortcomings by allowing remote participants to view local participants as if the local participants are also joining the online meeting virtually. In certain embodiments, upon launching an online meeting, the remote server can be configured to determine identities of the local participants based on identification photos via facial recognition. Facial recognition can involve identifying or verifying a person from a digital image or a video frame from a video source, for example, by comparing selected facial features from the digital image and facial data in a database. Example facial recognition techniques can identify facial features by extracting landmarks, or features, from the image of the person's face. For instance, a relative position, size, and/or shape of the eyes, nose, cheekbones, and jaw may be used as landmarks or features. These landmarks or features can then be used to search for other images with matching landmarks or features. Other example facial recognition techniques can also utilize three-dimensional facial recognition, skin texture analysis, or other suitable techniques. Based on the determined identity, a raw video stream of the local participants can be edited or otherwise modified into a set of individual video streams corresponding to each local participant. With the individual video streams, the remote server can be configured to provide additional functionalities to the remote participants to render the online meeting more productive and inclusive than with an overview video stream of the conference room, as described in more detail below with reference to FIGS. 1-6.

Figure 1:
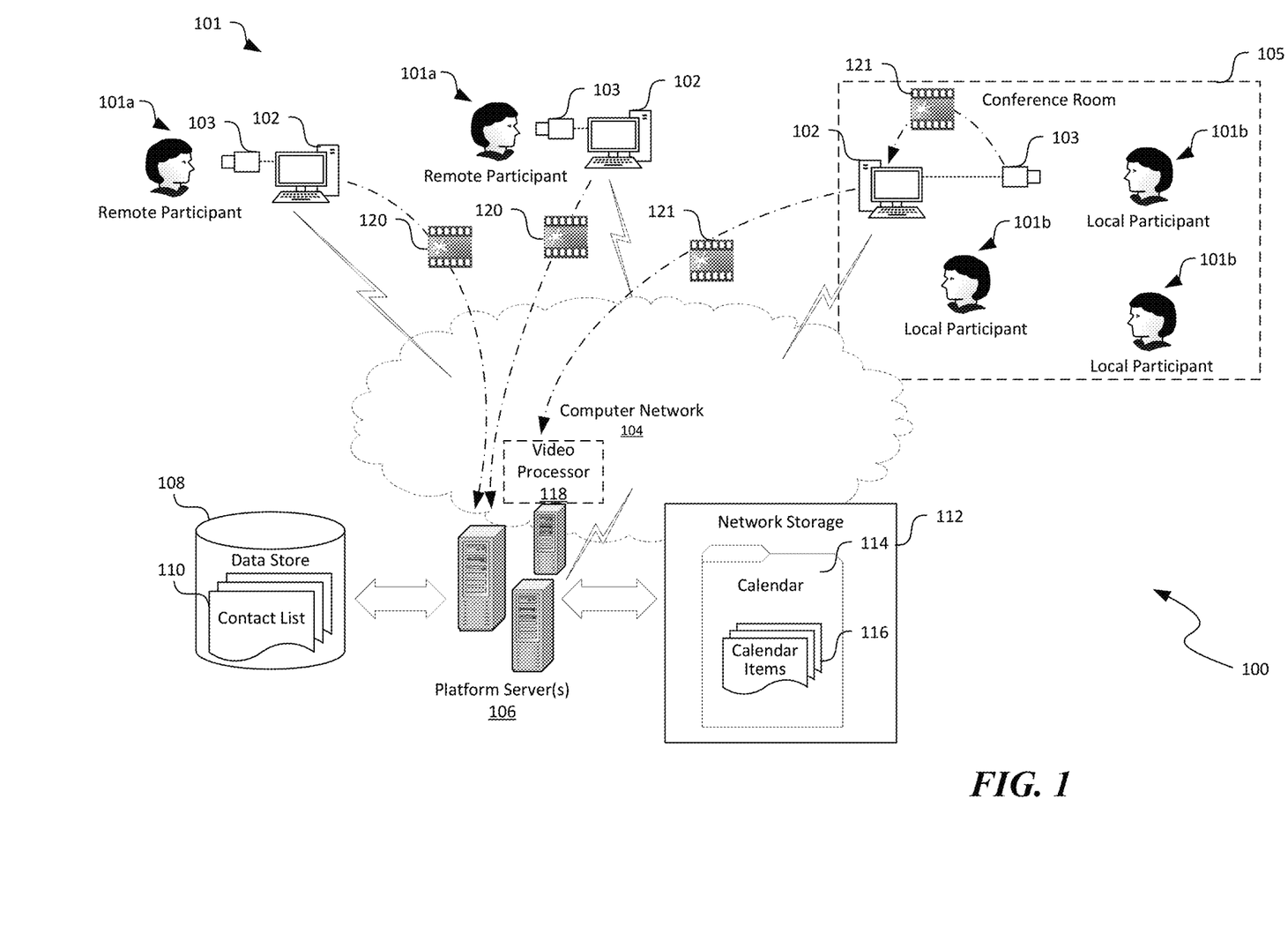
FIGS. 1-3 are schematic diagrams illustrating an online meeting platform in accordance with embodiments of the disclosed technology.
Figure 1B:
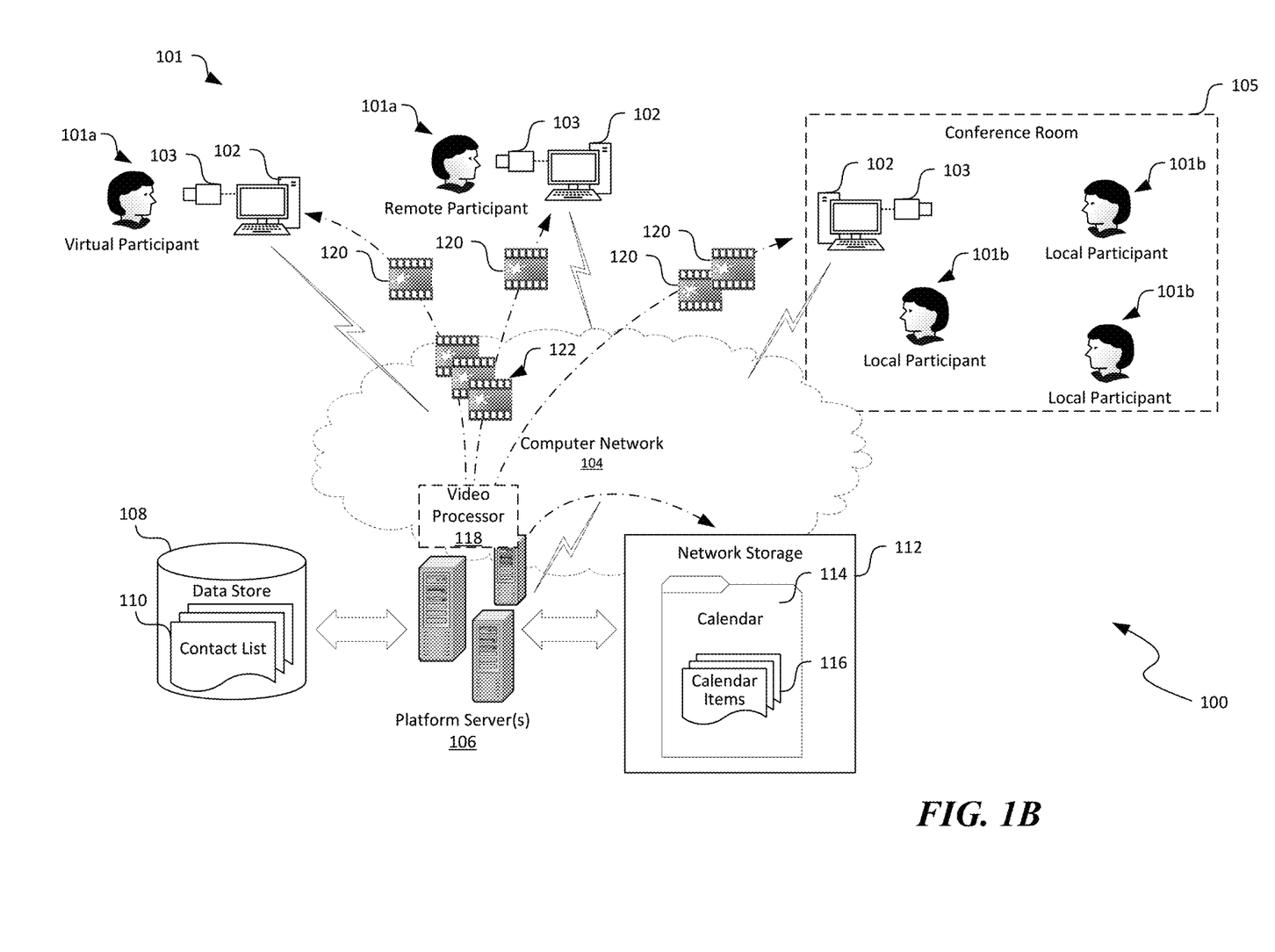
Figure 2:
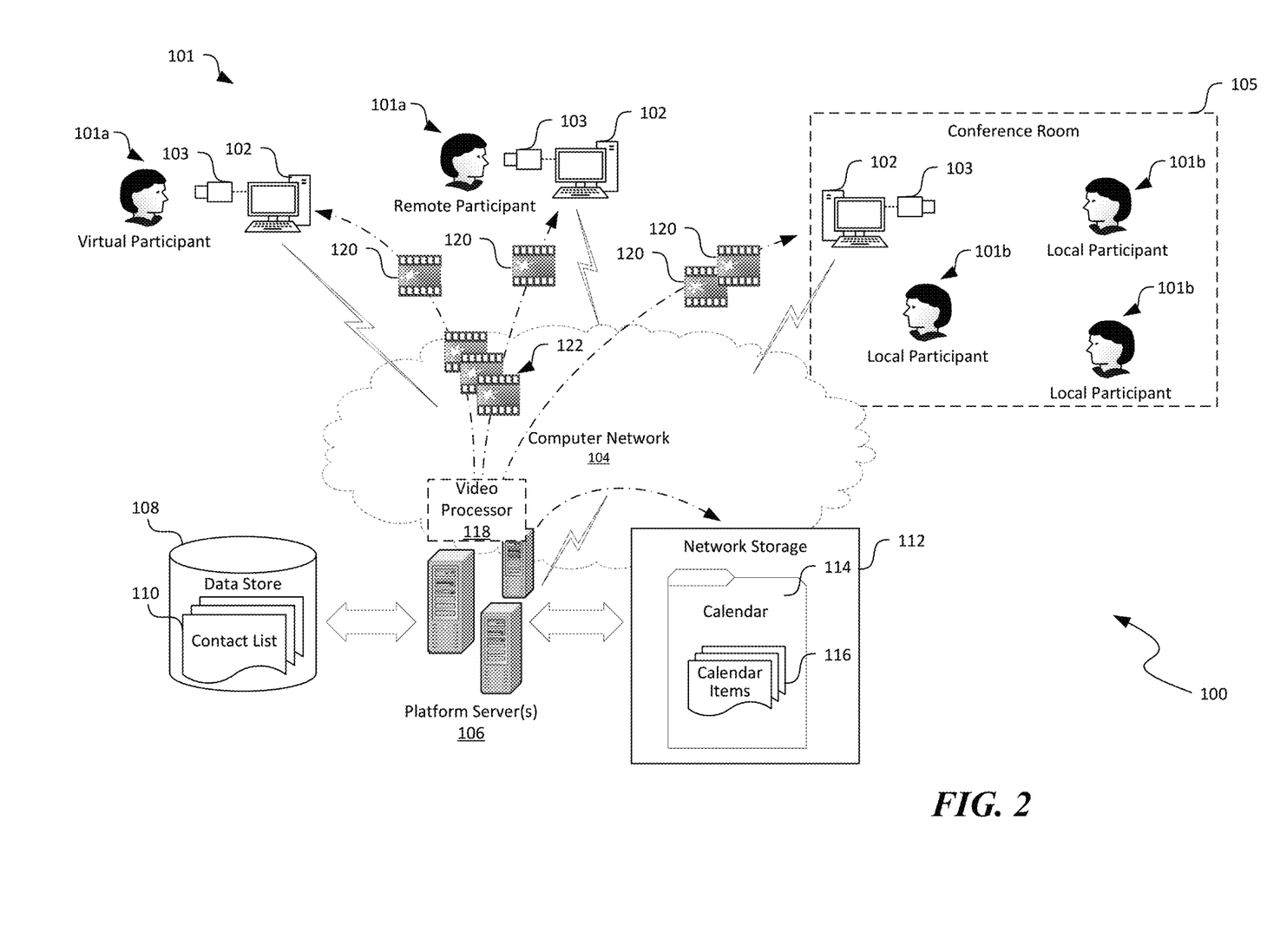
Figure 3:
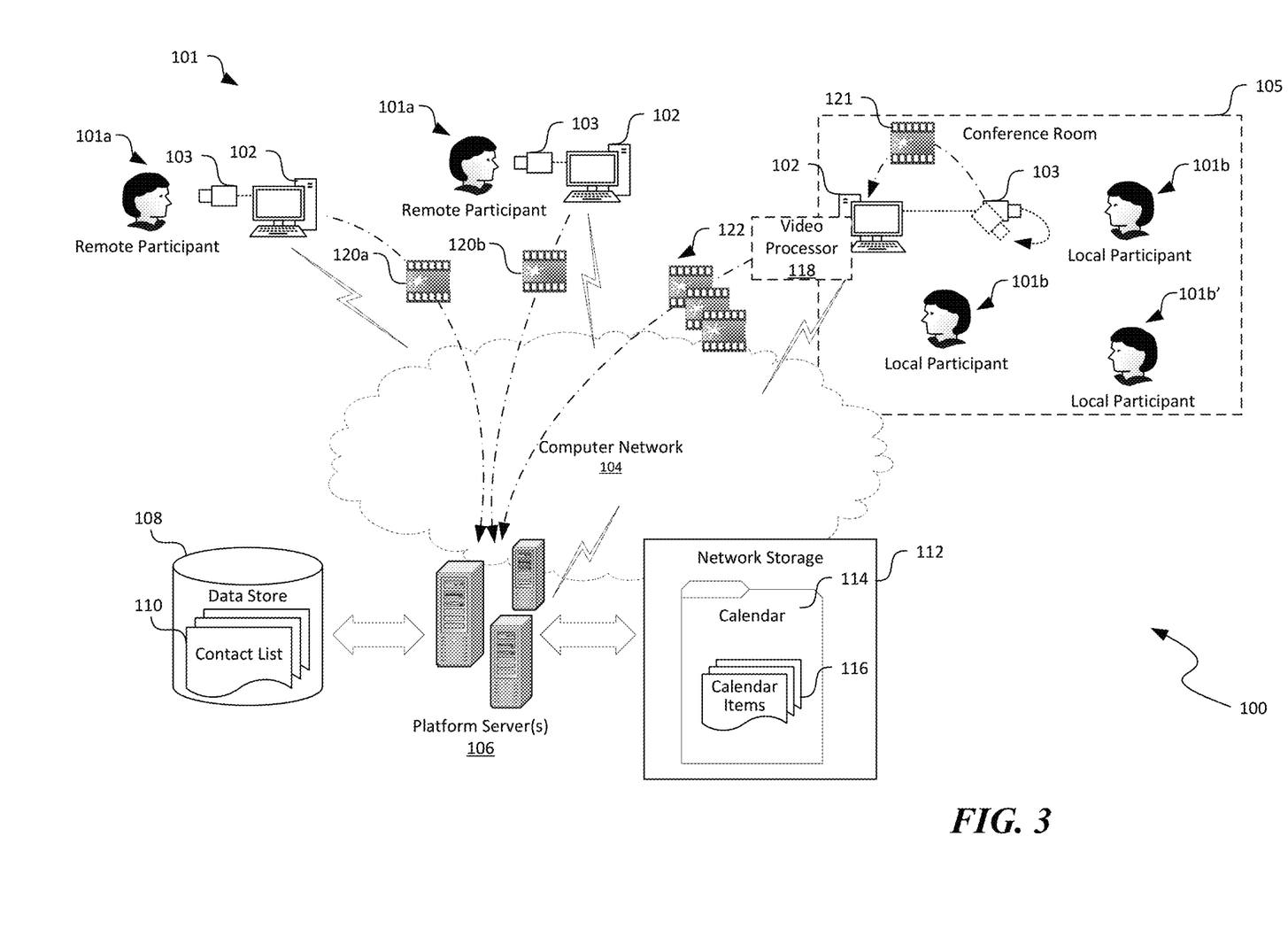

FIGS. 1-3 are schematic diagrams illustrating an online meeting platform 100 in accordance with embodiments of the disclosed technology. As shown in FIG. 1, the online meeting platform 100 can include a computer network 104 interconnecting platform servers 106 (referred to as "platform server 106" herein for simplicity) and multiple client devices 102. The platform server 106 is also interconnected with a network storage 112 containing calendar folder 114 with calendar items 116 and a data store 108 containing a contact list 110. The computer network 104 can include an intranet, a wide area network, the Internet, or other suitable types of networks. Even though particular components of the online meeting platform 100 are shown in FIG. 1, in other embodiments, the online meeting platform 100 can also include additional and/or different components or arrangements. For example, in certain embodiments, the online meeting platform 100 can also include additional network storage devices, additional hosts, and/or other suitable components (not shown). In other embodiments, the network storage 112 and/or the data store 108 may be integrated into the platform server 106.

In certain implementations, the calendar items 116 can individually include a data structure with multiple data fields (not shown) containing data representing a meeting start/end date/times, names and/or email addresses of participants (e.g., remote and/or local participants 101*a* and 101*b*), a meeting location (e.g., conference room 105), a Universal Resource Locator (URL) of a link to an online version of the meeting, and/or other suitable information. In other implementations, the calendar items 116 can also include a description, an attachment, or other suitable information.

The contact list 110 can include data that represent an address book that contains users of a company, school, social network, or other suitable types of organization. This address book can be accessed over the computer network 104 using Lightweight Directory Access Protocol ("LDAP"), vCard Extensions to WebDAV ("CardDAV"), or another suitable protocol. Example components of the contact list 110 can include electronic and/or physical addresses, organizational position, telephone numbers, profile or identification photos, video samples, and/or other suitable information. The contact list 110 can be managed by an administrator (not shown) or at least partially managed by the individual remote/local participants 101a and 101b.

The client devices 102 can each include a computing device that facilitates corresponding remote participants 101a and local participant 101b accessing computing services such as online meeting services provided by the platform server 106 via the computer network 104. For example, in the illustrated embodiment, the client devices 102 individually include a desktop computer. In other embodiments, the client devices 102 can also include laptop computers, tablet computers, smartphones, or other suitable computing devices. Even though a certain number of remote participants 101a and local participants 101b in a conference room 105 are shown in FIG. 1 for illustration purposes, in other embodiments, the online meeting platform 100 can facilitate any suitable number of remote/local participants 101a and 101b to access suitable types of computing services provided by the platform server 106.

As shown in FIG. 1, each client device 102 can be operatively coupled to a camera 103 configured to capture a video stream in real-time. In certain implementations, the camera 103 can be a build-in camera to the corresponding client device 102. In other implementations, the camera 103 can be external to and in electronic communication with the corresponding client device 102. For example, a suitable external camera 103 can be Logitech C930e webcam provided by Newark, Calif. In further implementations, the camera 103 and the corresponding client device 102 can be integrated into an online conferencing system, such as Logitech Room Solution provided by Logitech of Newark, Calif.

The platform server 106 can be configured to facilitate online interactions of the remote/local participants 101a and 101b via real-time video streaming and other related functionalities. For example, the client devices 102 can initially establish a streaming connection with the platform server 106 via Real Time Streaming Protocol or other suitable protocols. Upon establishing the streaming connections, the cameras 103 can capture a video of the remote/local participants 101a and 101b, and the corresponding client devices 102 can continuously transmit the captured video streams 120 and 121 to the platform server 106. In turn, the platform server 106 can relay the received video streams 120 or 121 to the other remote/local participants 101a and 101b, as shown in FIG. 2.

However, simply relaying the received video stream 121 from the client device 102 in the conference room 105 to the remote participants 101a can cause the user experience of the remote participants 101a to be very different than that of the local participants 101b. For instance, the video stream 120 from the conference room 105 may include a broad view of the conference room 105 with the local participants 101b. As such, the video stream 120 from the conference room 105 may not adequately identify the local participants 105 in the conference room 105 or who is currently speaking. Also, the broad view of the conference room 105 may lead the remote participants 101a to feel as observers instead of participants of the online meeting. The different user experiences may cause the online meeting to be less productive and inclusive than desired.

To address certain aspects of the foregoing drawbacks, the platform server 106 can be deploy a video processor 118 that is configured to generate a set of individual video streams 122 by editing the received video stream 121. As shown in FIG. 2, the video processor 118 can be configured to retrieve a calendar item 116 having data of the schedule online meeting from the calendar folder 114. The retrieved data can represent, for instance, names, email addresses, identification photos, organizational positions, office locations, and/or other suitable information of the local participants 101b. In other embodiments, the retrieved data can also include or be used to retrieve audio samples of the local participants 101b. Such audio samples may be previous recorded by the local participants 101b with appropriate user consent.

Upon receiving the video stream 121 from the client device 102 in the conference room 105, in certain embodiments, the video processor 118 can be configured to identify each local participant 101b using identification photos of the local participants 101b via facial recognition. For example, using the identification photos, the video processor 118 can be configured to identify facial features of the local participants 101b by extracting landmarks or features, such as a relative position, size, and/or shape of the eyes, nose, cheekbones, and jaw, from the identification photos of the local participants. The video processor 118 can then be configured to identify each local participants 118 in the video stream 121 using the extracted landmarks or features in one or more frames of the video stream 121. In other embodiments, the video processor can also be configured to identify each local participants via voice matching using the retrieved audio samples in lieu of or in addition to the identification photos. In further embodiments, each local participants may be identified via user tagging or via other suitable techniques.

Upon identifying each local participant 101b in the video stream 121, the video processor 118 can be configured to generate multiple individual video streams 122 corresponding to each local participant 101b in the conference room 105 from the video stream 121. In certain implementations, the video stream 121 captured by the camera 103 in the conference room 105 can be cropped or trimmed to eliminate other local participants 101b to generate an individual video stream 122 for one of the local participants 101b. In one embodiment, each frame of the cropped individual video stream 122 can have a preset fixed size (e.g., 1280 by 720 pixels) of an image and/or the identification photo of the local participant 101b in at least approximately a center of the image/video. In another embodiment, the image/video of the local participant 101b in each frame can be digitally zoomed to be a preset size. In further embodiments, the cropped individual video stream 122 can also have a preselected or dynamically adjusted aspect ratio (e.g., 3:4) or have other suitable characteristics. Once the individual video streams 122 are generated, the video processor 118 or other components of the platform server 106 can be configured to transmit the individual video streams 122 to the remote participants 101a instead of the video stream 121 originally received from the client device 102 in the conference room 105. In other implementations, the video processor 118 can be deployed in the client device 102 in the conference room 105, and the foregoing processing of the video stream 121 can be performed at the computing device 102 in the conference room 105 before transmitting the individual video streams 122 to the platform server 105 for delivery to the remote participants 101*a*, as shown in FIG. 3.

Also shown in FIG. 3, the video processor 118 can be configured to generate the individual video streams 122 by modulating and focusing the camera 103 located in the conference room 105. In one embodiment, upon detecting speech from a local participant 101*b*' in the conference room 105, the video processor 118 can be configured to control movement of the camera 103 (e.g., pivot, pan, etc.) toward the local participant 101*b*' providing the speech. The video processor 118 can also be configured to cause the camera 103 to focus on and optionally zoom in on the local participant 101*b*'. The video processor 118 can then capture an individual video stream 122 of the local participant 101*b*' via the camera 103 while the local participant 101*b*' continues to speak. In other embodiments, the video processor 118 can also be configured to filter out audio signals from other local participants 101*b* while speech is detected from the speaking local participant 101*b*'. While the camera 103 is focused on the speaking local participant 101*b*', individual video streams 122 of other local participants 101*b* may be looped or frozen.

Several embodiments of the video processor 118 can thus provide the individual video streams 122 to the remote participants 101*a* as if the local participants 101*b* are attending the meeting virtually. With the individual video streams 122, the platform server 106 can be configured to provide additional functionalities to the remote participants 101*a*. For example, the platform server 106 can be configured to identify each individual video streams 122 with a corresponding name, email address, or other suitable identifier of one of the local participants 101*b*. The platform server 106 can also be configured to identify a local participant 101*b* who is currently speaking, for instance, by providing a speech indicator on the individual video stream 122. In addition, the platform server 106 can be configured to allow the remote participants to mute one or more local participants 101*b* in the conference room 105 by activating suitable controls on the corresponding individual video streams 122. As such, the online meeting session with the individual video streams 122 can be more productive and inclusive than with an overview video stream of the conference room 105.

Figure 4:
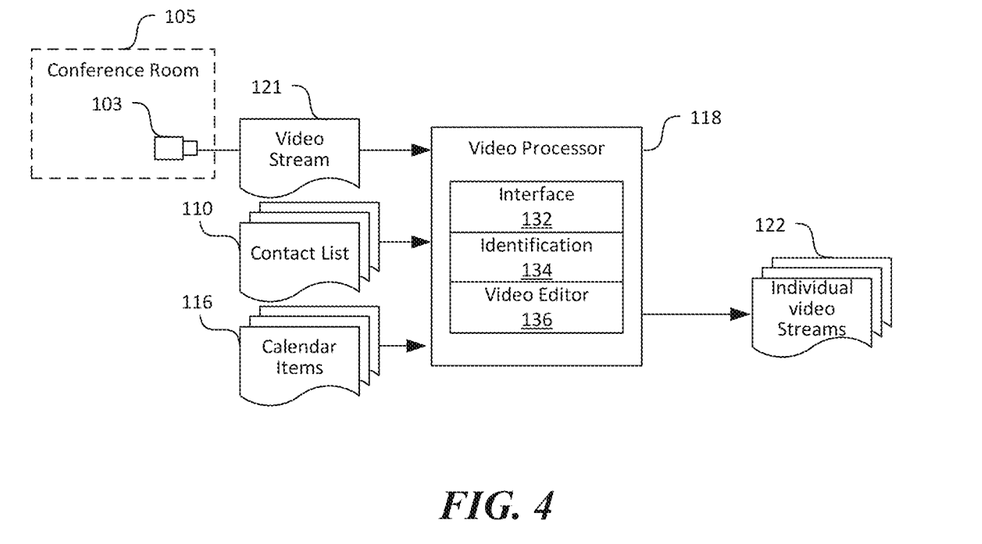
FIG. 4 is a schematic diagram illustrating certain hardware/software components of a video processor suitable for the online meeting platform of FIGS. 1-3 in accordance with embodiments of the disclosed technology.

FIG. 4 is a schematic diagram illustrating certain hardware/software components of a video processor 118 suitable for the online meeting platform of FIGS. 1-3 in accordance with embodiments of the disclosed technology. In FIG. 4 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 4, the video processor can include an interface component 132, an identification component 134, and a video editor 136 operatively coupled to one another. Though particular components are shown in FIG. 4, in other embodiments, the video processor 118 can also include additional and/or different components in additional to or in lieu of those shown in FIG. 4. The interface component 132 can be configured to receive and/or retrieve the contact list 110 and the calendar items 116 upon initiation of an online meeting. For example, the interface component 132 can be configured to identify an online meeting by, for instance, a meeting identifier, a URL, or other suitable parameters of the online meeting. Upon identifying the online meeting, the interface component 132 can be configured to retrieve one of the calendar items 116 corresponding to the identified online meeting. Based on the retrieved calendar item 116, the interface component 132 can be configured to identify all participants of the online meeting and retrieve corresponding contact list 110 of the identified participants. Upon receiving the video stream 121 from the camera 103 in the conference room 105, the interface component 132 can forward the received video stream 121 and the contact list 110 of the participants to the identification component 134 for further processing.

The identification component 134 can be configured to identify a local participant 101*b* (FIG. 1) captured in the video stream 121 based on information (e.g., identification photos and/or voice samples) included in the contact list 110. For example, the identification component 134 can be configured to initially determine whether a participant of the online meeting is attending remotely or locally. In response to determining that the participant is attending remotely, the identification component 134 skips performing identification of the participant. On the other hand, in response to determining that the participant is a local participant, the identification component 134 can examine one or more frames of the received video stream 121 and identify the local participant via facial recognition and/or voice matching. Upon identifying the local participant, the identification component 134 can forward the identity of the local participant to the video editor to generate a corresponding individual video stream of the local participant.

In certain embodiments, the video editor 136 can be configured to crop or trim the video stream 121 to eliminate other local participants 101b to generate an individual video stream 122 (FIG. 2) for the local participant 101b. In one embodiment, each frame of the cropped individual video stream 121 can have a preset fixed size (e.g., 1280 by 720 pixels) of an image and/or the identification photo of the local participant 101b in at least approximately a center of the image/video. In another embodiment, the image/video of the local participant 101b in each frame can be digitally zoomed to be a preset size. In further embodiments, the cropped individual video stream 122 can also have a preselected or dynamically adjusted aspect ratio (e.g., 3:4) or have other suitable characteristics. In yet further embodiments, the video editor 136 can also filter and remove audio of other local participants from the generated individual video stream of the local participant 101b.

Once the individual video stream 122 is generated, the video editor 136 can temporarily store the generated individual video stream 122 in, for instance, a buffer (not shown) and associate the individual video stream 122 with the identity of the local participant 101b. In one embodiment, the association is via modification of metadata of the generated video stream 122. In other embodiments, the association can be via other suitable data and/or metadata modification. Upon generation of the individual video stream 122, the video processor 118 or other components of the platform server 106 (FIG. 1) can be configured to transmit the individual video stream 122 to the remote participants 101a (FIG. 1) instead of the video stream 121.

Figure 5A:
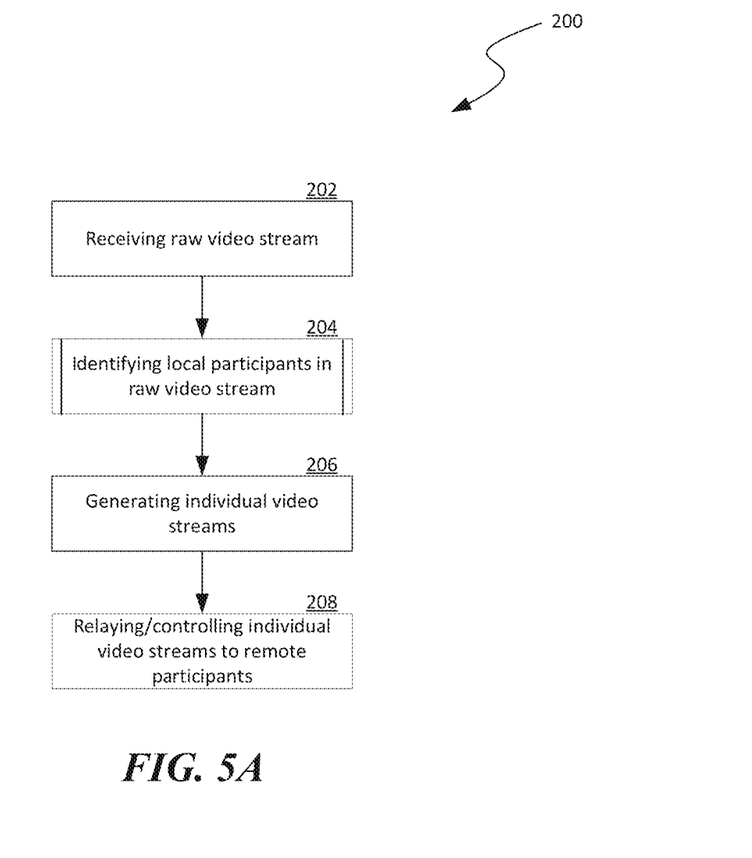
FIGS. 5A-5C are flowcharts illustrating processes of streaming data processing in an online meeting platform in accordance with embodiments of the disclosed technology.
Figure 5B:
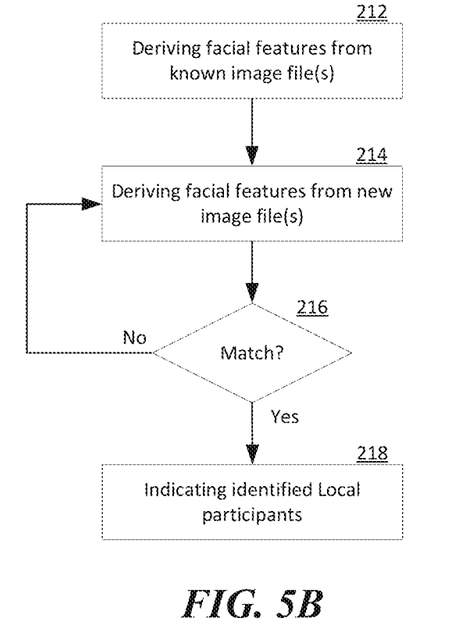
Figure 5C:
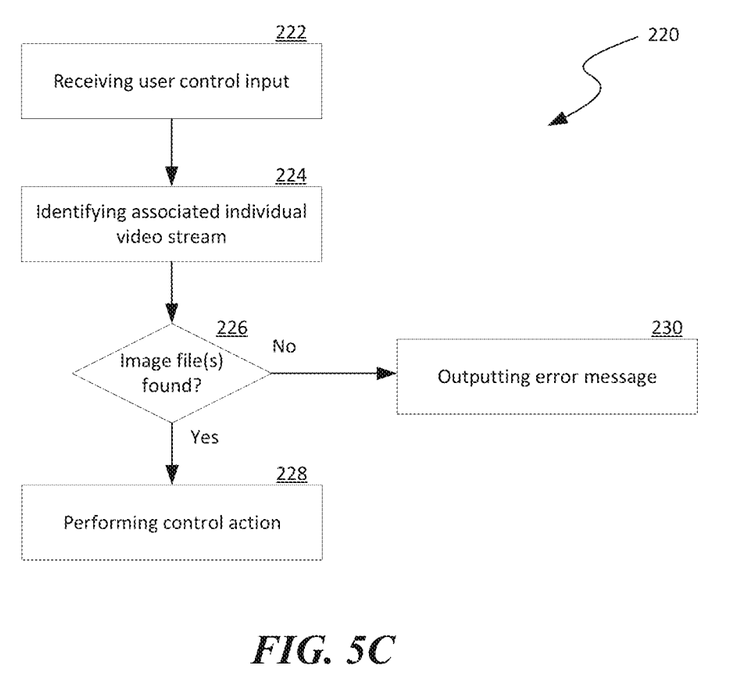

FIGS. 5A-5C are flowcharts illustrating processes of streaming data processing in accordance with embodiments of the disclosed technology. Even though embodiments of the processes are described below with reference to the online meeting platform 100 of FIGS. 1-3, in other embodiments, the processes may be implemented in other computing systems with different components and/or arrangements.

As shown in FIG. 5A, a process 200 can include receiving a raw video stream at stage 202. As described above with reference to FIG. 1, the raw video stream can include a video stream of multiple local participants 101b (FIG. 1) captured using a camera 103 (FIG. 1) in a conference room 105. Upon receiving the raw video stream, the process 200 can include identifying local participants in the received raw video stream at stage 204. As described above with reference to FIG. 2, identifying the local participants can be via facial recognition using identification photos of the local participants and/or via voice matching using voice samples of the local participants. Example operations of identifying the local participants are described in more detail below with reference to FIG. 5B. The process 200 can then include generating individual video streams from the raw video stream at stage 200. Example operations for generating the individual video streams are described above with reference to FIGS. 2 and 3. The process 200 can then include relaying and controlling the relay of the individual video streams to remote participants 101a (FIG. 1). Example operations of controlling the relay are described below with reference to FIG. 5C.

FIG. 5B illustrate example operations for identifying a local participant via facial recognition. As shown in FIG. 5B, the operations can include deriving facial features from known image files, such as profile or identification photos at stage 212. The operations can then include deriving facial features from new images, such as one or more frames form the raw video stream, at stage 214. In response to determining that the derived facial features from the known image files do not match those in the new images, the operations can revert to deriving facial features of additional images in the new images at stage 214. Otherwise, the operations can include indicating that a person (or other suitable image types) is identified in the new image.

FIG. 5C is flowchart illustrating a process 220 of controlling relay of a generated individual video stream in accordance with embodiments of the disclosed technology. As shown in FIG. 5C, the process 220 can include receiving a user control input at stage 222. The control input can include one or more commands of mute, pause, block, etc. The process 220 can then include identifying an associated individual video stream at stage 224. The process 220 can then include a decision stage 226 to determine whether the associated individual video stream is found. In response to determining that the associated individual video stream is not found, the process 220 can include outputting an error message. In response to determining that the associated individual video stream is found, the process 220 can include performing a corresponding control action at stage 228.

Figure 6:
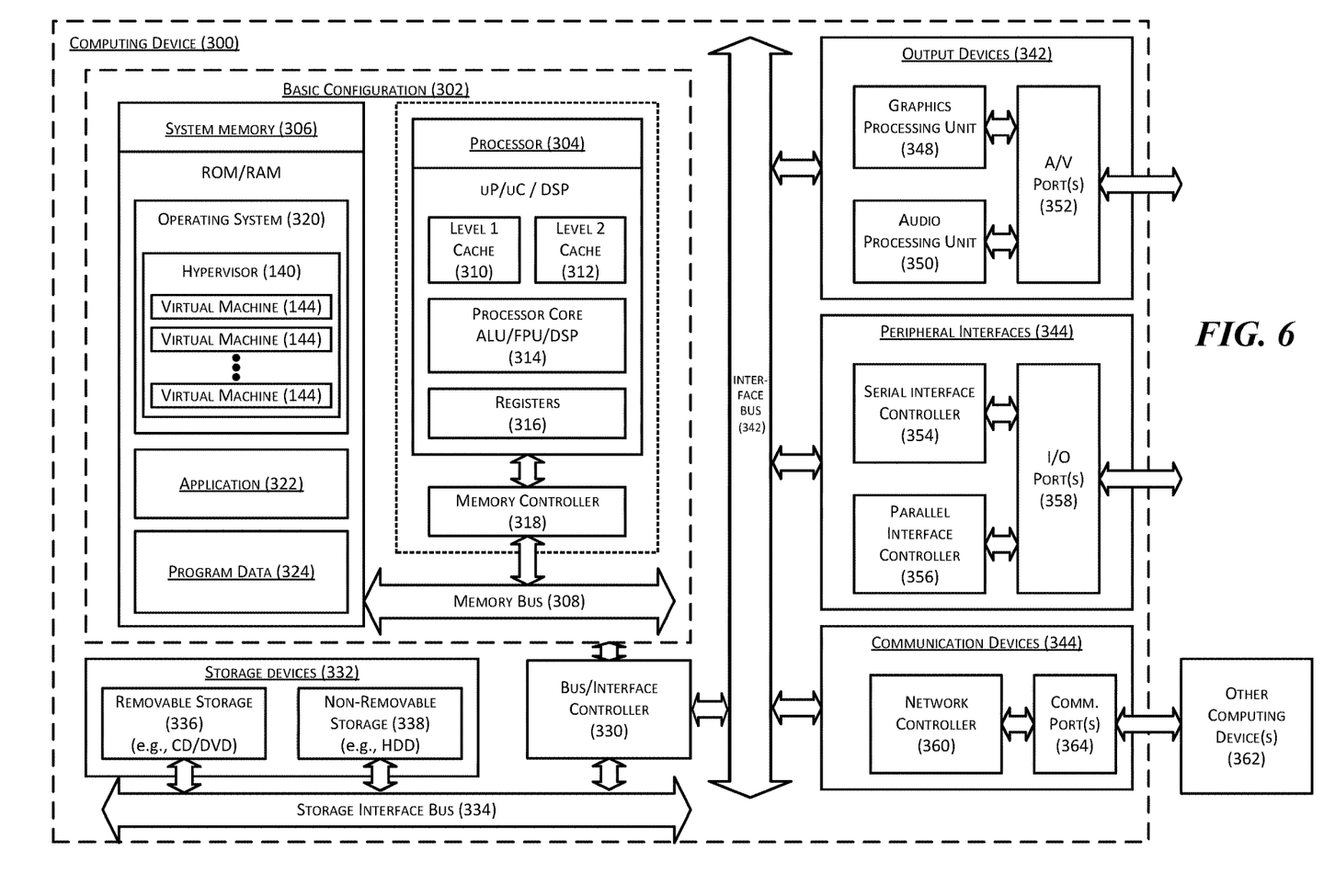
FIG. 6 is a computing device suitable for certain components of the distributed computing system in FIGS. 1-3.

FIG. 6 is a computing device 300 suitable for certain components of the online meeting platform 100 in FIGS. 1-3. For example, the computing device 300 can be suitable for the platform servers 106 or the client devices 102 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable, and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more NV ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of streaming data processing in an online meeting platform having a remote server, a first computing device located in a conference room, and a second plurality of remote computing devices remote from the conference room interconnected via a computer network, the method comprising:

receiving, at the remote server, a video stream captured by a camera of the first computing device located in the conference room, the video stream capturing images of multiple local participants of an online meeting that also has a plurality of remote participants joining the online meeting via the computer network using the second plurality of remote computing devices;

receiving, at the remote server, a plurality of video streams captured by cameras of the second plurality of remote computing devices, the plurality of video streams including a first remote video stream associated with a first remote participant and a second remote video stream associated with a second remote participant;

upon receiving the video stream captured by the camera of the first computing device, at the remote server,
determining identities of the captured images of the multiple local participants in the received video stream using meeting information of the online meeting; and
editing the received video stream from the first computing device to generate a set of individual video streams each corresponding to one of the multiple local participants and associating the generated set of individual video streams with the determined identities of the multiple local participants in the conference room;

transmitting, to a first remote computing device associated with the first remote participant, the generated set of individual video streams and the second remote video stream; and transmitting, to a second remote computing device associated with the second remote participant, the generated set of individual video streams and the first remote video stream.

2. The method of claim 1, further comprising:
retrieving, from a network storage, data representing the meeting information of the online meeting, the meeting information containing data representing names and identification photos of the multiple local participants; and
wherein determining the identities of the captured images of the multiple local participants includes determining the identities of the multiple local participants using the identification photos via facial recognition.

3. The method of claim 1 wherein determining the identities of the multiple participants includes:
determining that the first remote participant and the second remote participant are joining the online meeting remotely; and
in response to determining that the first remote participant and the second remote participant are joining the online meeting remotely, skipping determining an identity of the first remote participant and the second remote participant who are joining the online meeting remotely.

4. The method of claim 1, further comprising:
retrieving, from a network storage, data representing meeting information of the online meeting, the meeting information containing data representing identities of all participants; and
wherein determining the identities of the multiple participants includes:
determining that the first remote participant and the second remote participant are joining the online meeting remotely; and
in response to determining that the first remote participant and the second remote participant are joining the online meeting remotely, retrieving identification photos of the first remote participant and the second remote participant from a contact list and using the retrieved identification photos to determine identities of the first remote participant and the second remote participant captured in the first remote video stream and the second remote video stream.

5. The method of claim 1, further comprising:
retrieving, from a network storage, data representing meeting information of the online meeting, the meeting information containing data representing voice samples of all participants; and
wherein determining the identities of the multiple participants includes:
determining that the first remote participant and the second remote participant are joining the online meeting remotely; and
in response to determining that the first remote participant and the second remote participant are joining the online meeting remotely, using the voice samples in the retrieved data representing the meeting information to determine identities of the first remote participant and the second remote participant captured in the first remote video stream and the second remote video stream via voice matching.

6. The method of claim 1 wherein editing the received video stream includes:
for one of the multiple local participants,
cropping the received video stream to remove all other local participants from the received video stream; and
temporarily saving the cropped video stream as one of the individual video streams in the generated set.

7. The method of claim 1 wherein editing the received video stream includes:
for one of the local participants,
cropping the received video stream to remove all other local participants from the received video stream;
digitally enlarging the cropped video stream into a preset size; and
temporarily saving the digitally enlarged video stream as one of the individual video streams in the generated set.

8. The method of claim 1,
wherein transmitting the generated set of individual video streams to the first remote computing device includes transmitting the generated set of individual video streams with the associated identities of the multiple local participants in the conference room to the first remote computing device instead of the received video stream received from the first computing device, and
wherein transmitting the generated set of individual video streams to the second remote computing device includes transmitting the generated set of individual video streams with the associated identities of the multiple local participants in the conference room to the second remote computing device instead of the received video stream received from the first device.

9. A server in an online meeting platform having a first computing device located in a conference room and a second plurality of remote computing devices remote from the conference room interconnected to the server via a computer network, the server comprising:
a processor; and
a memory operatively coupled to the processor, the memory containing instructions executable by the processor to cause the computing device to:
receive a video stream captured by a camera of the first computing device located in the conference room, the video stream capturing images of multiple local participants of an online meeting that also has a plurality of remote participants joining the online meeting via the computer network using the second plurality of remote computing devices;
receive a plurality of video streams captured by cameras of the second plurality of remote computing devices, the plurality of video streams including a first remote video stream associated with a first remote participant and a second remote video stream associated with a second remote participant;
upon receiving the video stream captured by the camera of the first computing device located in the conference room,
determine identities of the captured images of the multiple local participants in the received video stream using meeting information of the online meeting; and
generate, based on the received video stream from the first computing device, a set of individual video streams each corresponding to one of the multiple local participants and associate the generated set of individual video streams with the determined identities of the multiple local participants;
transmit, to a first remote computing device associated with the first remote participant, the generated set of individual video streams and the second remote video stream; and
transmit, to a second remote computing device associated with the second remote participant, the generated set of individual video streams and the first remote video stream.

10. The computing device of claim 9 wherein the memory contains additional instructions executable by the processor to cause the computing device to:
retrieve, from a network storage, data representing the meeting information of the online meeting, the meeting information containing data representing names and identification photos of the multiple local participants; and
wherein to determine the identities of the captured images of the multiple local participants includes to determine the identities of the multiple local participants using the identification photos via facial recognition.

11. The computing device of claim 9 wherein the memory contains additional instructions executable by the processor to cause the computing device to:
retrieve, from a network storage, data representing meeting information of the online meeting, the meeting information containing data representing voice samples of all participants; and
wherein to determine the identities of the multiple participants includes to determine the identities of the multiple local participants using the voice samples in the meeting information via voice matching.

12. The computing device of claim 9 wherein to generate the set of individual video streams includes to:
for one of the multiple local participants,
crop the received video stream to remove all other local participants from the received video stream; and
temporarily save the cropped video stream as one of the individual video streams in the generated set.

13. The computing device of claim 9 wherein to generate the set of individual video streams includes to:
for one of the local participants,
crop the received video stream to remove all other local participants from the received video stream;
digitally format the cropped video stream into a preset size; and
temporarily save the digitally enlarged video stream as one of the individual video streams in the generated set.

14. A method of streaming data processing in an online meeting platform having a remote server, a first computing device located in a conference room, and a second plurality of remote computing devices remote from the conference room interconnected via a computer network, the method comprising:
receiving, at the remote server, a video stream captured by a camera of the first computing device located in the conference room, the video stream selectively capturing images of a first local participant from a plurality of local participants based on detected speech from the local participant;
receiving, at the remote server, a plurality of video streams captured by cameras of the second plurality of remote computing devices, the plurality of video streams including a first remote video stream associated with a first remote participant and a second remote video stream associated with a second remote participant;
transmitting, to a first remote computing device associated with the first remote participant, the video stream captured by the camera of the first computing device and the second remote video stream; and
transmitting, to a second remote computing device associated with the second remote participant, to a second remote computing device associated with the second remote participant, the generated set of individual video streams and the first remote video stream.

15. The method of claim 14, further comprising:
retrieving, from a network storage, data representing the meeting information of the online meeting, the meeting information containing data representing the identity of the first local participant; and
wherein associating the captured video stream with the identity of the first local participant includes associating the captured video stream with the identity of the local participant in the retrieved data representing the meeting information of the online meeting.

16. The method of claim 14, further comprising:
retrieving, from a network storage, data representing the meeting information of the online meeting, the meeting information containing data representing an identity and an identification photo of the first local participant; and
wherein associating the captured video stream with the identity of the local participant includes:
identifying the first local participant using the identification photo via facial recognition; and
associating the captured video stream with the identity of the local participant in the retrieved data representing the meeting information of the online meeting.

17. The method of claim 14, further comprising:
retrieving, from a network storage, data representing meeting information of the online meeting, the meeting information containing data representing a voice sample of the first local participant; and
wherein associating the captured video stream with the identity of the local participant includes:
identifying the first local participant using the voice sample via voice matching; and
associating the captured video stream with the identity of the first local participant in the retrieved data representing the meeting information of the online meeting.

* * * * *